(12) United States Patent
Metzler et al.

(10) Patent No.: US 12,179,612 B2
(45) Date of Patent: Dec. 31, 2024

(54) CARAVAN HAVING ELECTRICAL COMFORT FUNCTIONS

(71) Applicant: Thor Tech, Inc., Elkhart, IN (US)

(72) Inventors: Marcus Metzler, Bad Waldsee (DE); Rainer Buck, Wangen i. Allgau (DE); Günter Dorn, Schlier (DE); Wilhelm Müller, Sassenberg (DE)

(73) Assignee: Thor Tech, Inc., Elkhart, IN (US)

( * ) Notice: Subject to any disclaimer, the term of this patent is extended or adjusted under 35 U.S.C. 154(b) by 737 days.

(21) Appl. No.: 17/270,092

(22) PCT Filed: Aug. 23, 2019

(86) PCT No.: PCT/EP2019/072655
§ 371 (c)(1),
(2) Date: Dec. 10, 2021

(87) PCT Pub. No.: WO2020/039100
PCT Pub. Date: Feb. 27, 2020

(65) Prior Publication Data
US 2022/0105814 A1 Apr. 7, 2022

(30) Foreign Application Priority Data

Aug. 23, 2018 (DE) ..................... 10 2018 120 676.3

(51) Int. Cl.
| | |
|---|---|
| *B60L 50/60* | (2019.01) |
| *B60L 1/00* | (2006.01) |
| *B60L 1/02* | (2006.01) |
| *B60L 58/18* | (2019.01) |

(52) U.S. Cl.
CPC ............... *B60L 50/66* (2019.02); *B60L 1/003* (2013.01); *B60L 1/02* (2013.01); *B60L 58/18* (2019.02); *B60L 2200/16* (2013.01); *B60L 2200/28* (2013.01)

(58) Field of Classification Search
CPC ... B60D 1/06–065; B60L 50/66; B60L 53/53; B60L 53/62; B60J 5/047; B60P 3/32; B60Q 3/30
See application file for complete search history.

(56) References Cited

U.S. PATENT DOCUMENTS

| | | | | |
|---|---|---|---|---|
| 4,199,037 A | * | 4/1980 | White | B60K 3/04 180/65.245 |
| 4,269,280 A | * | 5/1981 | Rosen | B60L 50/53 60/711 |
| 4,556,247 A | * | 12/1985 | Mahaffey | B60P 3/32 322/1 |
| 5,559,420 A | * | 9/1996 | Kohchi | B60L 50/66 280/492 |

(Continued)

FOREIGN PATENT DOCUMENTS

| | | |
|---|---|---|
| DE | 20 2012 010 078 U1 | 3/2013 |
| DE | 10 2016 214 171 A1 | 2/2018 |

*Primary Examiner* — Erez Gurari
(74) *Attorney, Agent, or Firm* — Dinsmore & Shohl LLP

(57) ABSTRACT

In a camper having a battery and electric comfort functions, the battery has a great capacity for supplying electricity to a travel drive of a towing vehicle, and/or is designed for an optional travel drive of the camper during trailer operation in road traffic, and the electric comfort functions are supplied with electricity from the battery.

11 Claims, 2 Drawing Sheets

(56) References Cited

U.S. PATENT DOCUMENTS

| | | | | |
|---|---|---|---|---|
| 6,390,215 B1* | 5/2002 | Kodama | B60L 50/62 | 180/2.1 |
| 6,994,560 B2* | 2/2006 | Kohchi | H01R 13/7036 | 439/43 |
| 7,514,803 B2* | 4/2009 | Wilks | B60L 53/80 | 322/1 |
| 8,004,242 B1* | 8/2011 | Purkey | B60R 16/033 | 320/132 |
| 9,108,691 B2* | 8/2015 | Fanourakis | B62D 53/0871 | |
| 9,321,352 B2* | 4/2016 | Pierce | F25B 27/002 | |
| 9,457,666 B2* | 10/2016 | Caldeira | B60D 1/64 | |
| 9,505,307 B2 | 11/2016 | Champagne et al. | | |
| 9,834,133 B2* | 12/2017 | Bean | B60Q 1/305 | |
| 9,887,570 B2* | 2/2018 | Johnsen | B60L 53/14 | |
| 9,893,545 B2* | 2/2018 | Bean | H02J 7/007 | |
| 10,752,102 B2* | 8/2020 | Lampsa | B60L 58/21 | |
| 11,613,216 B2* | 3/2023 | Ildiz | B60R 16/0207 | 307/91 |
| 11,712,977 B2* | 8/2023 | Bucknor | B60L 53/53 | 180/2.1 |
| 11,712,979 B2* | 8/2023 | Jung | B60L 50/64 | 180/68.5 |
| 2005/0136726 A1* | 6/2005 | Kohchi | B60L 53/16 | 439/352 |
| 2007/0051542 A1* | 3/2007 | Wilks | B60L 53/80 | 180/65.1 |
| 2010/0065344 A1* | 3/2010 | Collings, III | B60L 3/10 | 180/2.1 |
| 2010/0252339 A1* | 10/2010 | Bibeau | B60K 6/48 | 180/11 |
| 2011/0114398 A1* | 5/2011 | Bianco | B60K 1/04 | 320/109 |
| 2011/0253463 A1* | 10/2011 | Smith | H02J 3/381 | 180/11 |
| 2013/0257145 A1* | 10/2013 | Caldeira | B60L 50/61 | 307/9.1 |
| 2014/0025245 A1* | 1/2014 | Fanourakis | B62D 59/04 | 280/433 |
| 2014/0116077 A1* | 5/2014 | Pierce | F25B 27/002 | 219/202 |
| 2014/0375272 A1* | 12/2014 | Johnsen | B60L 58/19 | 320/136 |
| 2016/0023587 A1* | 1/2016 | Bean | B60Q 1/305 | 340/431 |
| 2017/0063104 A1* | 3/2017 | Bean | H02J 7/007 | |
| 2018/0093655 A1 | 4/2018 | Healy et al. | | |
| 2019/0291560 A1* | 9/2019 | Lampsa | B60K 1/04 | |
| 2020/0114846 A1* | 4/2020 | Ildiz | B60R 16/033 | |
| 2021/0197645 A1* | 7/2021 | Larson | B60H 1/3232 | |
| 2022/0052306 A1* | 2/2022 | Burchett | H02G 5/10 | |
| 2022/0126714 A1* | 4/2022 | Bucknor | B60L 53/53 | |
| 2023/0021274 A1* | 1/2023 | Burchett | B60L 7/22 | |
| 2023/0096878 A1* | 3/2023 | Thomason | B60L 53/53 | 320/109 |
| 2023/0182613 A1* | 6/2023 | Jung | B60L 53/80 | 180/68.5 |

* cited by examiner

CARAVAN HAVING ELECTRICAL COMFORT FUNCTIONS

CROSS-REFERENCE TO RELATED APPLICATIONS

This application is the United States national phase of International Application No. PCT/EP2019/072655 filed Aug. 23, 2019, and claims priority to German Patent Application No. 10 2018 120 676.3 filed Aug. 23, 2018, the disclosures of which are hereby incorporated by reference in their entirety.

BACKGROUND OF THE INVENTION

A camper or travel trailer is a trailer for a motor vehicle, in which suitable equipment for persons to live and stay in it is installed. This equipment includes electric appliances and components that increase comfort and convenience and can be referred to as "comfort functions." Examples of this are ventilation, a radio/TV system, as well as heaters that allow camping even in the winter, and air conditioners to cool the camper during midsummer.

In this regard, the latter demonstrate very great energy consumption. For heating and cooking, gas is usually used as an energy source. An electric heater and, in particular, an air conditioner, as well as other electricity-intensive consumers can practically be used only if a connection to the power grid is available, for example at a campground. These devices, which can also optionally be provided with electric operation, can be grouped under the term electric comfort systems. Further examples of this are electric hotplates, ovens, and a refrigerator, as well as hot-water heaters, for example an electrically heated flow-through heater.

However, the vacationers or users also desire the possibility of extended autarchic operation. Such multi-day operation without an electricity connection to the public power grid has been known until now for basic functions such as lighting or water pumps, which are operated with a 12 V electricity system. Batteries such as those known as a starter battery for a motor vehicle having an internal combustion engine are used for such 12 V systems. These have a capacity of maximally approximately 100 Ah and can therefore theoretically store an energy of maximally approximately 1.2 kWh at 12 V.

In the state of the art, electric vehicles or hybrid vehicles are known, wherein in the case of the latter, their drive consists of a combination of an internal combustion engine with an electric drive. In this regard, the electric drive can be used in such a manner that it works in addition to the internal combustion engine and is turned on when increased power is required during acceleration phases or when traveling uphill on an incline. For example, during such operation the electric drive obtains its energy from an electric energy storage unit, in particular a battery, which is charged during uniform travel operation or during regenerative braking.

In the case of entirely electric vehicles, the range is reduced due to the great weight of the vehicle, but in particular due to the additional weight of a trailer as well as its air resistance, which is relatively high, for example, due to the great cross-sectional surface area in the case of a camper or travel trailer. For such vehicles, trailers are known in which energy storage units, in particular large batteries or rechargeable batteries, are placed, so as to make additional energy available for the towing vehicle. Such trailers are also referred to as "Range Extenders." In this regard, systems are also known in which the trailer has its own drive for its wheels, and pushes the towing vehicle.

The batteries of such trailers demonstrate a significantly greater energy content. This can be more than 50 kWh. In this regard, the working voltage of these rechargeable batteries or batteries is designed for electric travel drive and is significantly greater than 12 V.

SUMMARY OF THE INVENTION

The present invention is based on the task of making available a camper with which autarchic operation of comfort functions is possible to the greatest possible extent, or, alternatively, operation is possible even in the case of a low-power grid connection.

The task is accomplished, according to the invention, in that in the case of a camper having a battery and electric comfort functions, the battery has a great capacity, in particular for supplying electricity to a travel drive of a towing vehicle, and/or is designed for optional travel drive of the camper during trailer operation in road traffic, and the electric comfort functions are supplied with electricity from the battery.

If the camper is provided with batteries having great capacity or a high energy content, the electric comfort functions can be utilized in a completely autarchic manner for an extended period of time, and a connection to a public power grid does not have to be present. In particular, it is conceivable to make use of such batteries in a dual manner.

If the camper is towed as a trailer in road traffic by an electric vehicle or a hybrid vehicle, the range or performance capacity of the latter can be increased during peak times if electric energy is made available to the towing vehicle from the battery, for example by way of a cable connection. As a further variant, it is also conceivable that the camper itself has driven wheels, to which electricity is supplied from the battery, and therefore its drag resistance is reduced during long travel distances.

Because of the high electric capacity that is available, it is actually possible, in part, to make practical use of technologies in the camping sector for the first time, such as electric heaters and flow-through water heaters, for example. Campers without gas are possible, and thereby the handling of gas, which is unpleasant for many users, because they are not used to it, is avoided, and possibly safety is increased, as well.

It is advantageous if the battery has a capacity of more than 50 kWh.

Because of the significantly greater energy content as compared with known, usual starter batteries for motor vehicles, it is also possible to supply energy to electric comfort functions having a high energy consumption, such as air conditioners or heating elements, from the battery.

In an advantageous embodiment, the battery is arranged below a floor of the camper, as an under-floor battery.

The battery can be divided up into a front battery and a rear battery, between which an axle is arranged.

Because of the positioning of the battery as described or the division, an arrangement is obtained that is advantageous in terms of the center of gravity and, at the same-time, space-saving.

It is advantageous if the electric comfort functions are supplied by way of a voltage transformer, in particular with 230 V alternating current.

Many electric comfort functions are appliances that can be connected by way of power plugs, as they are also used in the household. A voltage transformer and outlets that correspond to the public power grid thereby allow the use of commercially available appliances. These appliances and components are particularly cost-advantageous. Furthermore, use takes place in the usual manner for the user, possibly with conventional appliances that are familiar to him/her, as in his/her own home.

The electric comfort functions can comprise at least one or more of the following: air conditioner, electric heater, in particular electric space heater, electric hotplates, electric oven, electric hot-water heater, ventilation, TV/radio systems, electric outdoor grill, air compressors for pneumatic suspension, water pumps, and maneuvering drive for the camper. It is also conceivable to use a plurality of further components that are usual in the household, such as microwaves, espresso machines, etc.

Other electric comfort functions, not mentioned here, are also conceivable. This particularly holds true for appliances and energy-intensive electric current consumers that are commonly used for camping.

In a further embodiment, the battery can be charged from a public power grid, by way of a charger.

It is true that frequently there is an electricity connection at a campground, but it is limited in terms of its performance or power backup. In order to be able to operate electric comfort functions that have a high electricity consumption, in particular an air conditioner, for example, in such a case, it is advantageous if the battery can be charged by way of the charger during long-term operation or for long periods of time, and if an electric comfort function can be used at greater power at least for short periods of time. Here, the battery serves as a buffer storage unit. In this regard, a charging possibility can be provided by means of a shock-proof plug, CEE, 16A, 32A or TYP2 charging adapter. In the event that a very powerful electricity connection is available, it is possible to provide a quick-charging possibility. Using this, it is possible to charge the battery in less than 60 minutes, for example, and an extended period of autarchic use is then available again, for example more than two days.

The power consumption of the charger can be restricted.

As a result, the charger can be adapted to the possible power consumption, and tripping of fuses, for example, can be prevented.

It is advantageous if the battery is a high-performance battery, in particular a rechargeable lithium ion battery.

Batteries in which a greater energy density is present with regard to weight and/or volume as compared with lead batteries can be referred to as high-performance batteries. This energy density is above and outside of the corresponding values for known lead batteries. Aside from the slightly lighter nickel-cadmium batteries, these are, for example, nickel-hydrogen, nickel-iron, nickel-zinc, nickel-metal hydride and silver-zinc, as well as sodium-nickel chloride and sodium-sulfur batteries. Lithium ion batteries are the most commonly used.

In an advantageous embodiment of the invention, the comfort functions and/or further electricity consumers are divided up into different circuits, of which one or more can be turned on or off with priority by a controller, or their power can be reduced.

Such a controller can extend the autarchic usage period in that prioritization of the comfort functions takes place, and particularly important functions or possibly functions that can also be adjusted by the user are available longer, even if other functions have already been turned off due to the reduced battery capacity.

BRIEF DESCRIPTION OF THE DRAWINGS

The following detailed description of specific embodiments of the present disclosure can be best understood when read in conjunction with the following drawings, where like structure is indicated with like reference numerals and in which.

DESCRIPTION OF THE INVENTION

Figure 1:
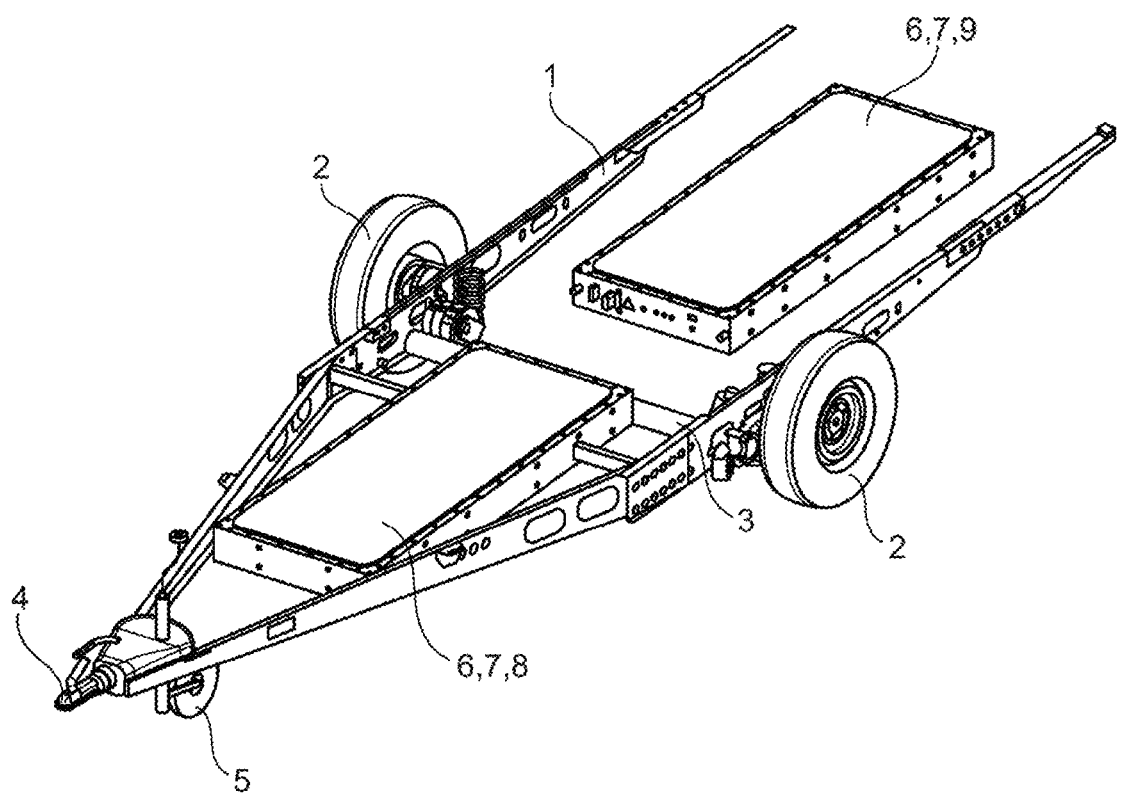
FIG. 1 is a schematic illustration of an exemplary vehicle frame of a camper, according to embodiments shown and described herein.
Figure 2:
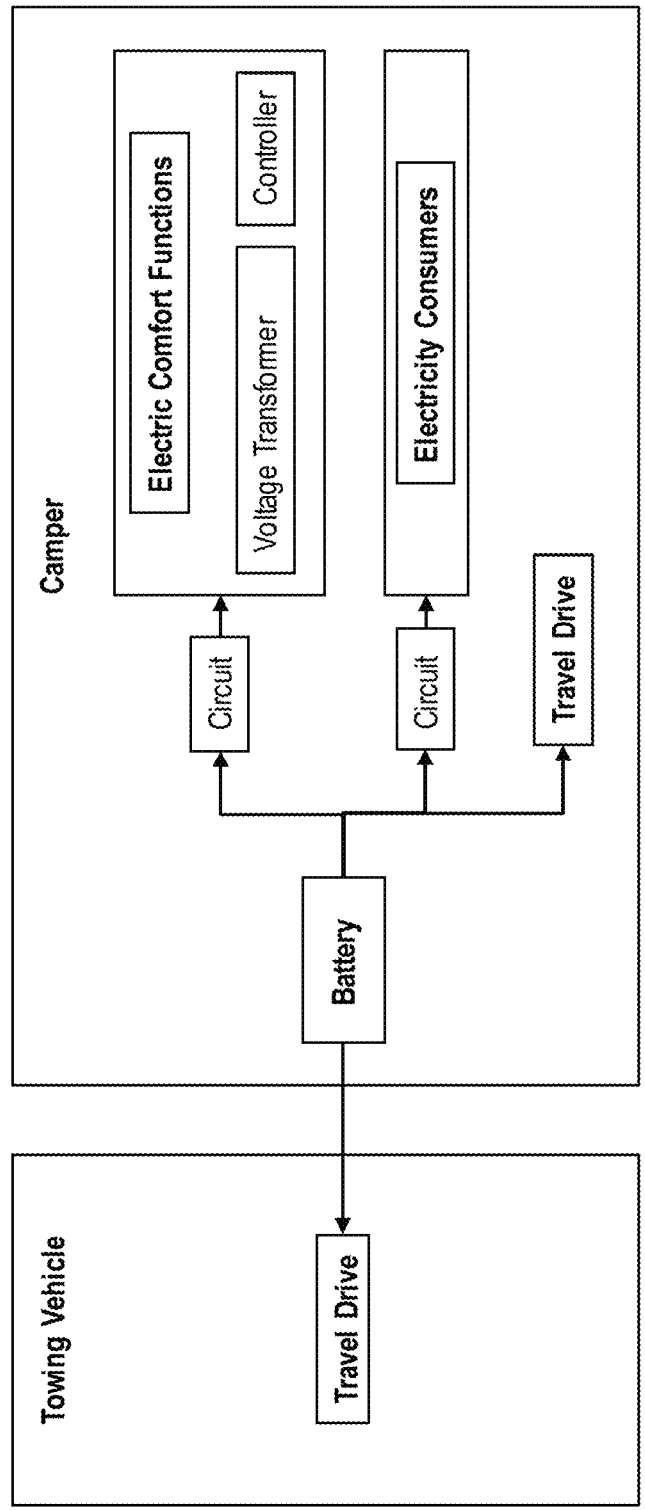
FIG. 2 is a schematic illustration of a block diagram of a towing vehicle and camper, according to embodiments shown and described herein.

Further advantages and details of the invention are explained in greater detail using the exemplary embodiment shown in the schematic FIGS. 1 and 2. In this regard, the FIG. 1 shows a vehicle frame 1 of a camper according to the invention, not shown in any detail, having the wheels 2 on an axle 3 as well as a coupling head 3 as well as a support wheel 4. A battery 6 as a high-performance battery 7 is arranged below the floor of the camper, not shown here, as an under-floor battery, and divided up into a front battery 8 that lies in front of the axle 3 and a rear battery 9.

Even electric comfort functions that have high electricity consumption, such as an air conditioner, for example, can be used autonomously and independent of a power supply from the battery 6, which has a high energy content at relatively low weight, as a high-performance battery 7. The electric comfort functions are available even independent of a campground with its power supply.

The invention claimed is:

1. A camper comprising a camper travel drive, a rechargeable battery, electric comfort functions, further electricity consumers, and a controller, wherein:
   the rechargeable battery has a capacity of greater than 50 kWh for supplying electricity to a towing vehicle travel drive and the camper travel drive during trailer operation in road traffic;
   the rechargeable battery supplies electricity to the electric comfort functions through a voltage transformer and to the further electricity consumers;
   the controller enables autarchic operation of the electric comfort functions under power supplied by the rechargeable battery;
   the electric comfort functions and the further electricity consumers are divided into different electrical circuits; and
   the controller prioritizes certain of the electric comfort functions by turning on, turning off, or reducing power to the different electrical circuits to extend an autarchic operation period of the electric comfort functions.

2. The camper according to claim 1, wherein:
   the rechargeable battery is arranged below a floor of the camper, as an under-floor battery.

3. The camper according to claim 2, wherein:
   the rechargeable battery divided into a front battery and a rear battery between which an axle is arranged.

4. The camper according to claim 3, wherein:
   the electric comfort functions comprise at least one or more of the following: air conditioner, electric heater, electric hotplates, electric oven, electric hot-water heater, ventilation, TV/radio systems, electric outdoor grill, air compressors for pneumatic suspension, water pumps, and maneuvering drive for the camper.

5. The camper according to claim 2, wherein:
   the electric comfort functions comprise at least one or more of the following: air conditioner, electric heater, electric hotplates, electric oven, electric hot-water heater, ventilation, TV/radio systems, electric outdoor grill, air compressors for pneumatic suspension, water pumps, and maneuvering drive for the camper.

6. The camper according to claim 1, wherein:
the electric comfort functions comprise at least one or more of the following: air conditioner, electric heater, electric hotplates, electric oven, electric hot-water heater, ventilation, TV/radio systems, electric outdoor grill, air compressors for pneumatic suspension, water pumps, and maneuvering drive for the camper.

7. The camper according to claim 6, wherein:
the electric heater is an electric space heater.

8. The camper according to claim 1, wherein:
the rechargeable battery can be charged from a public power grid, by way of a charger.

9. The camper according to claim 8, wherein:
power consumption of the charger can be restricted.

10. The camper according to claim 1, wherein:
the voltage transformer comprises 230 V alternating current.

11. The camper according to claim 1, wherein:
the rechargeable battery is a lithium ion battery.

* * * * *